United States Patent
Jones

(10) Patent No.: US 10,394,256 B2
(45) Date of Patent: Aug. 27, 2019

(54) GAS MANAGEMENT SYSTEM AND CONTROLLER

(71) Applicant: Critical Systems, Inc., Boise, ID (US)

(72) Inventor: Theodore J. Jones, Draper, UT (US)

(73) Assignee: CRITICAL SYSTEMS, INC, Boise, ID (US)

( * ) Notice: Subject to any disclaimer, the term of this patent is extended or adjusted under 35 U.S.C. 154(b) by 297 days.

(21) Appl. No.: 15/360,439

(22) Filed: Nov. 23, 2016

(65) Prior Publication Data
US 2017/0147009 A1    May 25, 2017

Related U.S. Application Data

(60) Provisional application No. 62/260,156, filed on Nov. 25, 2015.

(51) Int. Cl.
*G05D 7/06* (2006.01)
*G05B 15/02* (2006.01)
*G05B 19/418* (2006.01)

(52) U.S. Cl.
CPC .......... *G05D 7/06* (2013.01); *G05B 15/02* (2013.01); *G05B 19/4184* (2013.01); *G05B 19/41855* (2013.01); *G05B 2219/41108* (2013.01); *G05B 2219/45076* (2013.01); *Y02P 90/14* (2015.11)

(58) Field of Classification Search
CPC .. G05D 7/06; G05B 15/02; G05B 19/141855; G05B 2219/4108; F17D 5/00
See application file for complete search history.

(56) References Cited

U.S. PATENT DOCUMENTS

| | | | | |
|---|---|---|---|---|
| 5,410,495 A | * | 4/1995 | Ramamurthi | G05B 9/02 702/100 |
| 2010/0219960 A1 | * | 9/2010 | Moe | G01N 33/0032 340/632 |
| 2012/0131217 A1 | * | 5/2012 | Delorme | G06Q 10/06 709/230 |

* cited by examiner

*Primary Examiner* — Phuc T Dang
(74) *Attorney, Agent, or Firm* — FisherBroyles, LLP; Gregory R. Lunt

(57) ABSTRACT

Embodiments are directed to a gas supply system, a gas panel monitoring system and to a gas distribution platform controlled via a high availability computing cluster. In one case, a gas supply system is provided which includes a gas panel defining an enclosure that includes a gas dispensing manifold. Gas flow through the gas dispensing manifold is regulated using solenoids. The gas supply system also includes a redundant control system that is electrically connected to the solenoids. The redundant control system is configured to send actuation signals to the solenoids to allow or prevent gas from flowing through the gas dispensing manifold. The gas supply system further includes a communications module that allows the redundant control system to monitor multiple gas panels. The monitoring includes receiving feedback from gas cabinet components regarding component operational status, and also transmitting actuation signals from the redundant control system to the gas panel.

18 Claims, 5 Drawing Sheets

GAS MANAGEMENT SYSTEM AND CONTROLLER

CROSS-REFERENCE TO RELATED APPLICATIONS

This application claims priority to and the benefit of U.S. Provisional Application No. 62/260,156, entitled "FLOW CONTROL, RFID OPERATOR VALIDATION AND CENTRALIZED MANAGEMENT", which was filed on Nov. 25, 2015, and which is incorporated by reference in its entirety herein.

BACKGROUND

Gas and liquid provisioning systems have long been used in the manufacturing industry. Semiconductor fabrication assemblies, solar panel manufacturing facilities and other types of industrial production machines and facilities use controlled amounts of gases and liquids in the production of high-tech goods. Typically, however, the gas supply machines that supply the gas and other liquids are custom built for one type of tool, and do not work with other tools. Moreover, any software programming applied in the gas supply machines is custom coded onto a programmable logic device (PLC), which is expensive and provides a single point of failure in the system.

BRIEF SUMMARY

Embodiments described herein are directed to a gas supply system, a gas panel monitoring system and to a gas distribution platform controlled via a high availability computing cluster. In one embodiment, a gas supply system is provided which includes a gas panel defining an enclosure that includes a gas dispensing manifold, where gas flow through the gas dispensing manifold is regulated using solenoids. The gas supply system also includes a redundant control system that is electrically connected to the solenoids. The redundant control system is configured to send actuation signals to the solenoids to allow or prevent gas from flowing through the gas dispensing manifold. The gas supply system further includes a communications module that allows the redundant control system to monitor a plurality of gas panels. The monitoring includes receiving feedback from gas cabinet components regarding component operational status, and also transmitting actuation signals from the redundant control system to the gas panel.

In another embodiment, a gas panel monitoring system is provided. The gas panel monitoring system includes cameras positioned in view of a gas panel, which is located within a controlled access area. The gas panel monitoring system also includes cameras positioned in view of an access door that allows entrance into to the controlled access area. Also included is an equipment recognition system configured to determine whether pieces of equipment are being taken into the controlled access area and, if so, identify which pieces of equipment are being taken into the controlled access area. A controller is also provided in the gas panel monitoring system, which is configured to monitor video feed data from the cameras to verify that safety protocol steps related to the identified pieces of equipment are being followed before access to the gas panel in the controlled access area is granted.

In another embodiment, a gas distribution platform controlled via a high availability computing cluster is provided. The gas distribution platform includes multiple gas panels each defining an enclosure including therein a gas dispensing manifold, where gas flow through the gas dispensing manifold is regulated using solenoids. The gas distribution platform also includes a high availability computing cluster configured to receive information from and communicate information to the plurality of gas panels.

The high availability computing cluster includes a first computing system that controls the gas panels. The first computing system has an assigned internet protocol (IP) address and is configured to host a web server via a shared IP address. The high availability computing cluster also includes a second computing system that acts as a backup to the first computing system. The second computing system also has an assigned IP address. The first and second computing systems are interchangeable with each other, so that if the first computing systems fails, the second computing system will assume control of the gas panels, and will take over hosting the web server via the shared IP address. The high availability computing cluster further includes at least one software application running independently on both the first and second computing systems, which is configured to operate the gas panels. Still further, the high availability computing cluster includes a redundant hardware interface configured to communicate commands generated by the software application with the gas panels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
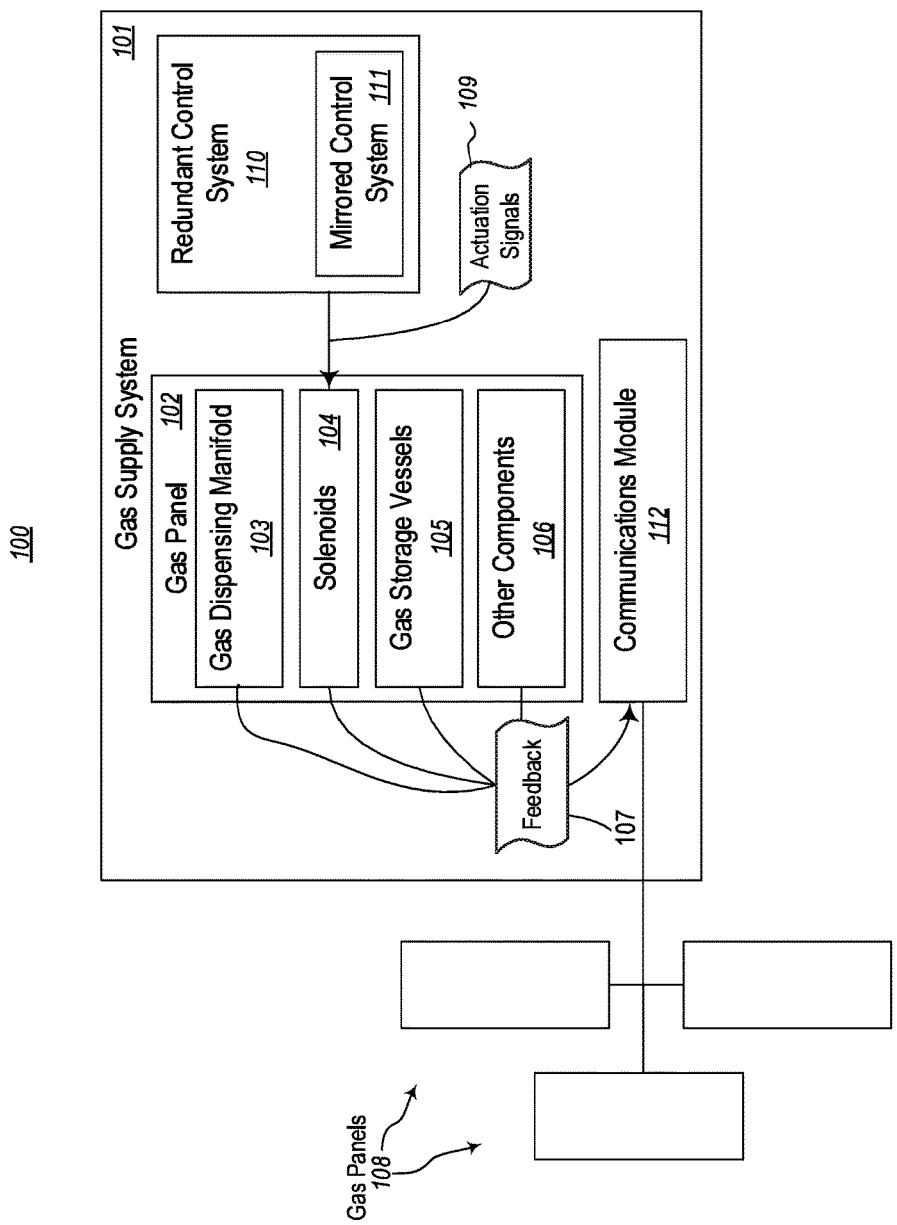
FIG. 1 illustrates an embodiment of a gas supply system that controls multiple gas panels.

Embodiments described herein are directed to a gas supply system, a gas panel monitoring system and to a gas distribution platform controlled via a high availability computing cluster. In one embodiment, a gas supply system is provided which includes a gas panel defining an enclosure that includes a gas dispensing manifold, where gas flow through the gas dispensing manifold is regulated using solenoids. The gas supply system also includes a redundant control system that is electrically connected to the solenoids. The redundant control system is configured to send actuation signals to the solenoids to allow or prevent gas from flowing through the gas dispensing manifold. The gas supply system further includes a communications module that allows the redundant control system to monitor a plurality of gas panels. The monitoring includes receiving feedback from gas cabinet components regarding component operational status, and also transmitting actuation signals from the redundant control system to the gas panel.

In another embodiment, a gas panel monitoring system is provided. The gas panel monitoring system includes cameras positioned in view of a gas panel, which is located within a controlled access area. The gas panel monitoring system also includes cameras positioned in view of an access door that allows entrance into to the controlled access area. Also included is an equipment recognition system configured to determine whether pieces of equipment are being taken into the controlled access area and, if so, identify which pieces of equipment are being taken into the controlled access area. A controller is also provided in the gas panel monitoring system, which is configured to monitor video feed data from the cameras to verify that safety protocol steps related to the identified pieces of equipment are being followed before access to the gas panel in the controlled access area is granted.

In another embodiment, a gas distribution platform controlled via a high availability computing cluster is provided. The gas distribution platform includes multiple gas panels each defining an enclosure including therein a gas dispensing manifold, where gas flow through the gas dispensing manifold is regulated using solenoids. The gas distribution platform also includes a high availability computing cluster configured to receive information from and communicate information to the plurality of gas panels.

The high availability computing cluster includes a first computing system that controls the gas panels. The first computing system has an assigned internet protocol (IP) address and is configured to host a web server via a shared IP address. The high availability computing cluster also includes a second computing system that acts as a backup to the first computing system. The second computing system also has an assigned IP address. The first and second computing systems are interchangeable with each other, so that if the first computing systems fails, the second computing system will assume control of the gas panels, and will take over hosting the web server via the shared IP address. The high availability computing cluster further includes at least one software application running independently on both the first and second computing systems, which is configured to operate the gas panels. Still further, the high availability computing cluster includes a redundant hardware interface configured to communicate commands generated by the software application with the gas panels.

As shown in environment 100 of FIG. 1, a gas supply system 101 can include many different components. The gas supply system 101 uses these components to deliver gas, liquids or other materials to machinery, tools, devices or other items that use the gas or other materials. For example, fabrication assemblies used to make semiconductors or solar panels use many different kinds of gases in the construction of silicon wafers. Some of these gases are extremely corrosive or otherwise unsafe for human contact. Many of the gases need to be delivered to the machinery at a specified pressure and/or flow rate. Accordingly, the gas supply system 101 can use its various components to regulate and control the flow of gas or other materials from a gas source, through the gas supply system 101, and on to a tool or machine.

In at least some embodiments, the flow of gas may be fed through a gas panel 102 with various components. The gas panel 102 may include an enclosure that has a gas dispensing manifold 103. The gas dispensing manifold may be designed to receive one or more different gas input feeds, and route the gas to one or more different outputs. Gas flow through the gas dispensing manifold 103 may be regulated using one or more solenoids 104. The solenoids, in response to an electrical control signal (e.g. actuation signal 109), open or close a valve that either prevents or permits gas to flow through the manifold 103. The solenoids 104 may, for example, control valves that sit between the gas storage vessels 105 and the gas dispensing manifold 103.

The solenoids are activated using an activation signal 109 sent from a redundant control system 110. The redundant control system 110 is electrically connected to the solenoids 104, and is configured to send actuation signals 109 at specified times to the solenoids 104 to allow or prevent gas from flowing through the gas dispensing manifold 103. The redundant control system may include various hardware components including a server (e.g. a blade server), a backup server and a redundant hardware controller. These components may be part of the mirrored control system 111. The mirrored control system 111 may be fully capable of taking over the monitoring and control of the gas panels normally performed by the redundant control system 110. The redundant control system 110 may operate the gas panel 102 based on feedback received from the manifold 103, from the solenoids 104, from the gas storage vessels 105 or from other components 106 in the gas panel. This feedback 107 is received via a communications module 112.

The communications module 112 allows the redundant control system 110 to monitor the gas panel 102, as well as other gas panels 108 that may be in the immediate area of gas panel 102, or may be remote to gas panel 102. The monitoring performed by the communications module 112 may include receiving feedback 107 from gas cabinet components regarding component operational status. The operational status may indicate a gas flow rate, pressure, volume, temperature, time of operation, or other operational status information. The communications module 112 may receive and assimilate this information, and send all or portions of it to the redundant control system 110. In some cases, the communications module may then receive actuation signals from the redundant control system 110 and forward those signals to the gas panel 102 and/or to other gas panels 108.

The gas panel 102 may be constructed in substantially any shape or size, and may be configured to hold many different types of components. For instance, the gas panel 102 may include gas storage and dispensing vessels 105. These gas storage vessels may be mounted in the enclosure of the gas panel 102, and may be joined in gas flow communication with the gas dispensing manifold 103. Many other components 106 including solenoids 104, pressure transducers, switches, valves, and even the communications module 112 and the redundant control system 110 may be mounted in the gas panel 102. The gas panel itself may be mounted or otherwise set up within a room of a manufacturing building. In some cases, this room is in a controlled access area.

Indeed, in some embodiments, the gas panel 102 and/or the redundant control system 110 are located in a secure room that is only accessible to authorized persons. The authorized persons provide credentials indicating proof of identity. Such proofs of identity may include username and password, personal identification number (PIN), biometric authentication (e.g. fingerprint, eye scan, voice recognition), electronic badges or cards that communicate with a secure reader (e.g. Bluetooth or RFID readers), or other type of authentication. Once the user has been identified, they system may determine that the user has a list of certifications. These certifications may allow the user to perform certain tasks within the secure room that houses the gas panel 102. This secure room may be monitored using the gas panel monitoring system 201 of FIG. 2, as explained further below.

The redundant control system 110 of FIG. 1 has at least one secondary, mirrored control system 111 that can assume control of the gas panel on demand. Although only one mirrored control system 111 is shown in FIG. 1, it will be understood that substantially any number of mirrored control systems may be put in place to support the gas supply system 101 as failover devices. The mirrored control system 111 may include the same or different hardware than the redundant control system 110, which itself includes at least one hardware processor, at least some system memory, and at least some data storage with computer executable instructions that, when executed, perform software methods. The redundant control system 110 can, for example, receive feedback inputs 107 from gas panel components and determine how to operate the gas panel components based on these inputs.

If, for example, pressure is too high, a valve manifold box (VMB) may be used within the gas panel 102 to lower the pressure and regulate the flow of gases through the gas dispensing manifold 103. Thus, the redundant control system can ensure that pressure and flow to any machinery or tools that are connected to the gas panel 102 remains substantially constant. In traditional systems, only the regulator supports flow from the gas cabinet, which leads to pressure irregularities and lack of precise control over pressure and flow. The valve manifold box may include or may be connected to an electronic pressure regulator that controls gas pressure to an inlet of a mass flow controller (MFC) which itself controls gas flow in the gas panel. Thus, the gas panel 102 allows use of an electronic pressure regulator that is not susceptible to droop and does not have deleterious supply pressure effects.

The electronic pressure regulator may be a dome loaded pressure regulator, an electro-pneumatic pressure regulator, or some other kind of regulator. Each of these regulators may be configured to receive control signals issued by the redundant control system. In this manner, the redundant control system 110 may be used to control the operation of the pressure regulator, in addition to the other components of the gas panel 102. In some cases, pressure feedback readings at the mass flow controller may be provided to the dome loaded pressure regulator or to the electro-pneumatic pressure regulator to control gas line pressure. These regulators take input signals from the redundant control system 110, which tells the regulators what pressures they need to be at.

In some embodiments, a pressure transducer may be moved downstream past the mass flow controller, and may read the pressure in the line and communicate it back to the pressure regulator. The pressure regulator increases or decreases the pressure on the dome of the regulator to maintain the set point pressure. The downstream MFC is used to then control the flow, once the pressure has been set and stabilized. Feedback from tools or machinery receiving the gas flow may be provided to the redundant control system 110. The redundant control system 110 can then use the communications module 112 to communicate changes to the MFC, if needed, regarding what amount of flow it needs to deliver.

The dome loaded regulator thus provides stable pressure, and the MFC adjusts the flow to deliver what is demanded by the tool or machinery. Both the MFC and pressure regulator can operate using digital or analog input signals. As such, the redundant control system 110 can be programmed to provide the proper analog or digital signals. If an operator needed to change the MFC, an isolation valve and purge valve may be placed in front of the MFC and behind a vent valve and an isolation valve. The pressure transducer would then sit between the MFC and the vent valve and, as such, would be able to monitor an ensuing purge sequence.

In some embodiments, the communications module 112 of the gas supply system 101 may additionally be configured to provide remote access to the redundant control system 110. For example, the communications module 112 may be able to receive commands or messages from other computing systems such as portable electronic devices. By allowing remote access, the redundant control system 110, can be accessed at any time from substantially any location with an internet connection. Thus, as will be shown further in FIG. 4 below, a remote user may monitor and/or control the functionality of the gas supply system 101 via a portable electronic device such as a cell phone, tablet or laptop.

Figure 2:
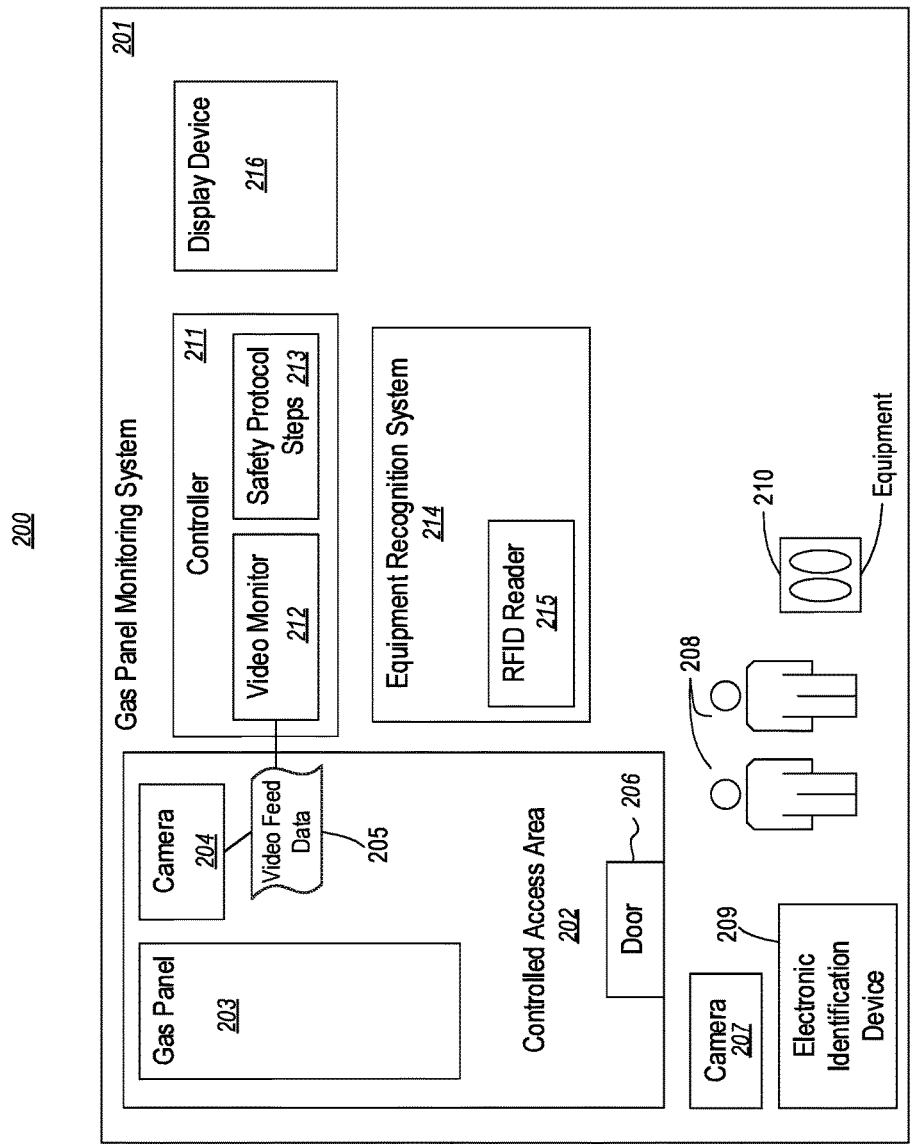
FIG. 2 illustrates an embodiment of a gas panel monitoring system that control access to gas panels in a controlled area.

Turning now to environment 200 of FIG. 2, a gas panel monitoring system 201 is provided. The gas panel monitoring system 201 includes one or more cameras (204 and 207) positioned in view of at least one gas panel (203). The gas panel 203 is located within a controlled access area 202. The controlled access area may be any type of room or location that is off limits to the public. For instance, the controlled access area 202 may be a room that is sectioned off via a door 206. The door may have an electronic identification device 209 that allows or prevents entry into the controlled access area 202. The electronic identification device 209 may, for example, perform biometric scans, or may be an RFID reader that reads the identification tags of the persons 208 wanting to enter the room.

The persons 208 may be qualified workers who perform tasks within the controlled access area 202. For instance, gas containing vessels or other equipment 210 may need to be changed within the gas panel 203. In some cases, these gas containing vessels are only to be changed out by persons having a specified level of training or certification. The electronic identification device 209 can thus verify the identity of the persons 208 attempting to access the controlled access area 202, and can determine, based on their identity, whether they possess the necessary training or qualifications to enter and perform those tasks. The camera 207 may be used to further ensure the identity of the persons or determine that the appropriate number of persons is present to perform a task. For example, some gas panel tasks require two qualified workers. The camera 204 may also be used for these purposes, as it can monitor the gas panel 203 and what goes on in relation to that panel.

The camera 207 may be used as the sole means of verification prior to permitting access to the controlled access area 202, or the camera 207 may be used in conjunction with the electronic identification device 209 and/or other identity verifying devices. An equipment recognition system 214 may be used determine whether pieces of equipment are being taken into the controlled access area and, if so, to identify which pieces of equipment are being taken into the controlled access area 202. The equipment recognition system 214 may use the camera 207 and/or other devices such as RFID readers 215 to determine which pieces of equipment are being brought into the controlled access area 202.

The equipment 210 may, for example, have RFID chips affixed thereto, and may use these chips to identify the equipment type and learn other characteristics about the equipment including size, quantity, manufacturer, production date, compatibility with the gas panel or other pertinent information. The equipment recognition system 214 may thus be used in conjunction with the camera 207 and/or the electronic identification device 209 to identify which persons 208 are entering the controlled access area 202, and which pieces of equipment are entering the controlled access area.

The gas panel monitoring system 201 also includes a controller 211 that monitors video feed data 205 from the cameras (204 and/or 207) to verify that safety protocol steps 213 related to the identified pieces of equipment are being followed before access to the gas panel in the controlled access area is granted. For instance, if safety protocol requires that the persons 208 are wearing certain protective outerwear, the controller 211 could monitor the video feed data to determine whether the persons were wearing that gear. If the safety protocol steps 213 require that two persons be in the controlled access area 202 to perform a task on the gas panel 203, the controller 211 may again look at the video feed data 205 and/or information from the electronic identification device 209 to determine that two persons are entering. If safety protocol steps 213 required that the persons each have a specified certification, or that the gas panel could only have components from a certain manufacturer, or that only certain types of gases or chemicals could be present in the controlled access area 202, the controller 211 may use the various inputs from the gas panel monitoring system 201 to determine whether certain safety protocol steps 213 are being taken. If these protocols are not followed, the controller 211 may sound an alarm or other alert.

Thus, in this manner, the gas panel monitoring system 201 prevents unauthorized or noncertified persons from accessing the controlled access area 202. The electronic identification device 209 grants or prevents access to the controlled area 202 based on electronic identifiers provided to the electronic identification device. The gas panel monitoring system 201 thus knows who the operators are and what their qualifications are. If unauthorized operators attempt to access the controlled access area 202, they may be locked out and prevented from such access. If a job requires two qualified operators, and both of the operators' badges have not been read, the controller 211 can prevent the operators from accessing the area. This helps ensure that safety protocols are followed, which is especially important when dealing with highly volatile or toxic chemicals. The controller 211 may be programmed to make decisions on safety protocol compliance without human intervention. Thus, the controller 211 can access the various video feeds and electronic identification device information to independently make decisions on whether safety protocol is being followed, and allow or prevent access to the controlled access area 202 based on those decisions.

The gas panel monitoring system may also include a display device 216 that is configured to display video feed data 205 from the cameras 204 and 207 positioned in view of the gas panel and the entrance to the controlled access area 202. The display device 216 may be local to the gas panel 202 or may be remote. For instance, the display device 216 may be part of a mobile electronic device or other remote computing system. The display allows users such as mangers or other operators to receive visual confirmation of gas system's operation. This is shown in greater detail in FIG. 4.

A mobile device 408 or other electronic device may be equipped with a gas supply system management software application 401. The application 401 may provide access to controllers 402 (such as the controller 211 of FIG. 2), switches 403 or other hardware components or devices within a gas supply system (e.g. 101 of FIG. 1). The application 401 may show the current operational status 404 of various components including pressure 405, flow rate 406, or other desired status indicators. The application 401 may also be configured to show the video feed data 205 from the cameras 204 and 207. As such, a user 407 may be able to view current status information for any of the components of the gas supply system, and may also be able to send actuation signals to the various components to operate those components in accordance with design specifications.

Figure 4:
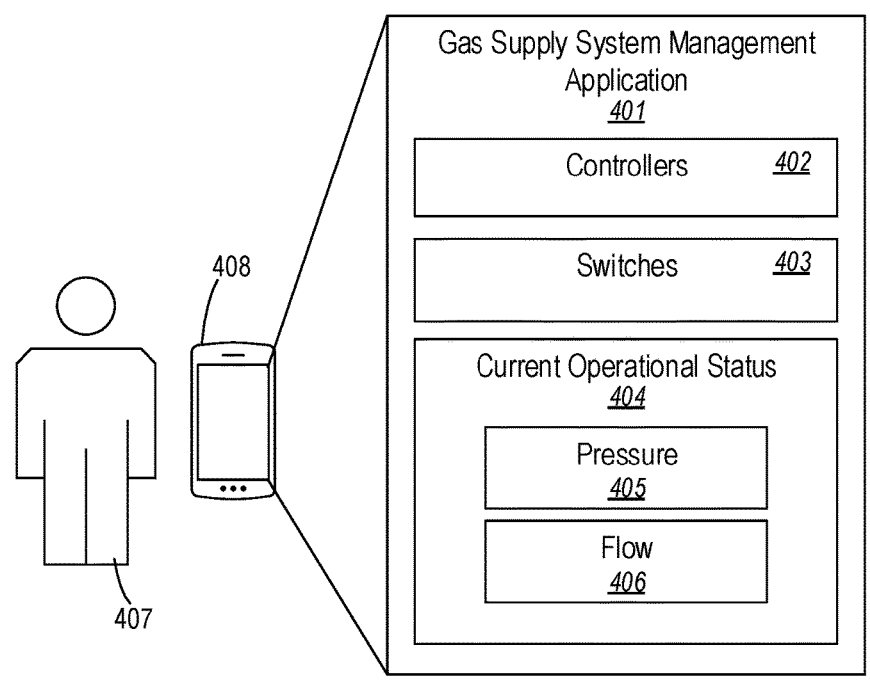
FIG. 4 illustrates an embodiment of a gas supply system management application used to control gas supply systems.

Thus, video feed data 205 of FIG. 2 from the camera positioned in view of the at least one gas panel 202 (i.e. camera 204), and video feed data from the camera positioned in view of the access door 206 (i.e. camera 207) can be provided to the portable electronic device 408 of FIG. 4 for monitoring. The handheld electronic device may be configured to shows the facility location for each system, and allows synchronization of the device with the gas supply system 101 and/or the gas panel monitoring system 201 for gas change or maintenance operations. The software application 401 may be programmed to guard against unintended operations, or may provide promptings to stay within the safety protocol steps 213. The software application 401 may also be programmed to authenticate users prior to receiving or issuing any commands to the gas supply system. Only when a user is authenticated and known to the system will gas supply system commands be accepted.

The gas supply system management application 401 may be provided on a single computing system, or may be provided from a distributed, redundant computing system. For instance, in environment 300 of FIG. 3, a high availability computing cluster 301 is provided. The high availability cluster 301 includes two or more computing systems (303A and 303B) with the same (or similar) software applications for operating a gas supply system or "gas panel." Each of the two or more computing systems has its own internet protocol (IP) address so as to be identified within a network. While each of the computing systems has its own IP address, the computing systems may share a common IP address. In cases where more than two computing systems are used, all of the computing systems in the pool may share the same common IP address. External data requests may use the common IP address to communicate with the high availability computing cluster 301 in general.

Figure 3:
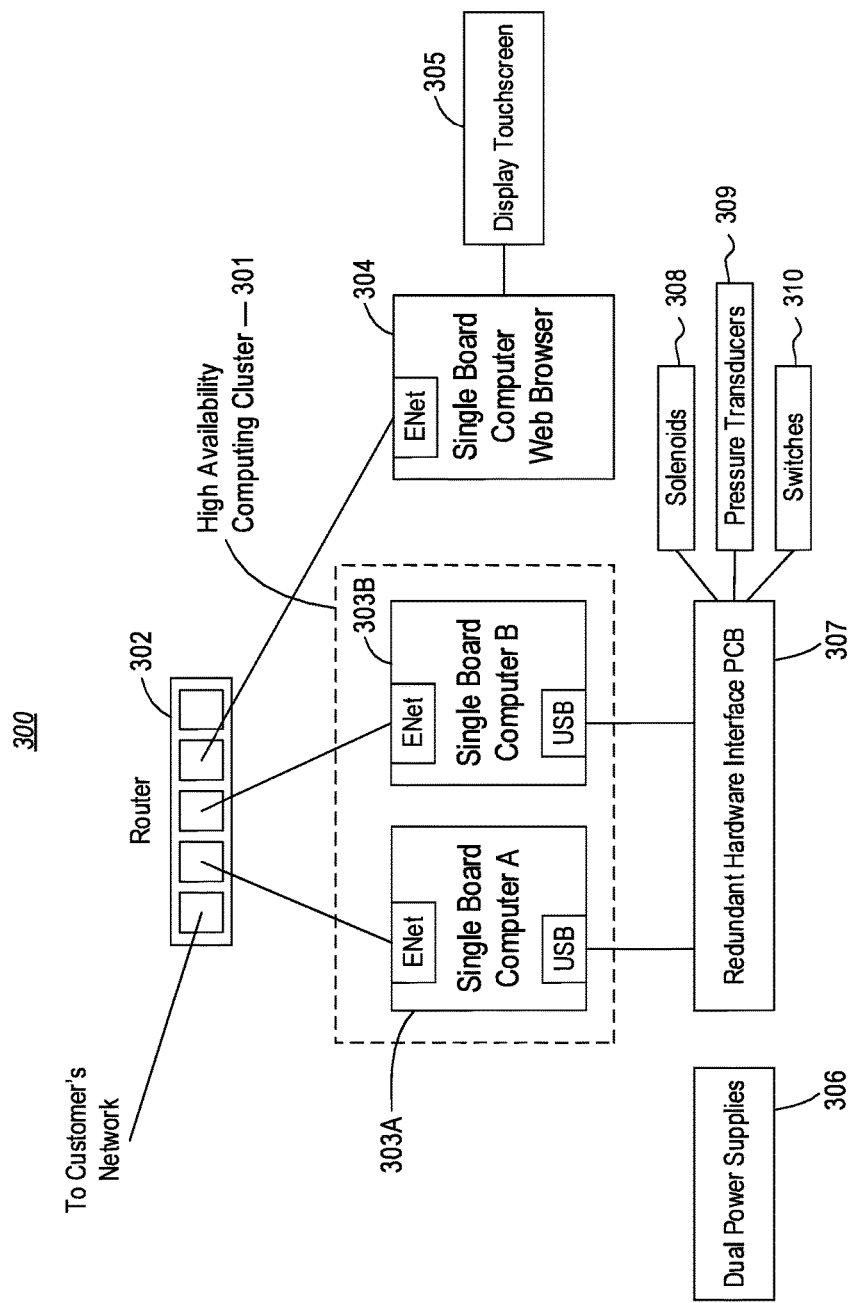
FIG. 3 illustrates an embodiment of a high availability computing cluster that controls devices such as gas panels.

As shown in FIG. 3, the single board computer A (303A) may be configured as the default computer among the pool of computing systems that will be operating the gas supply system 101 and/or the gas panel monitoring system 201. Computer 303B may be configured to enter a standby mode where it listens to the operating state of the hardware device. If, for some reason, computer 303A fails, computer 303B will take over the control of the gas panel seamlessly and automatically. Additionally or alternatively, computer 303A may be configured to host a web server or other application (e.g. application 401). If computer 303A goes down, then computer 303B may be configured to host the web server or other application via the shared IP address.

Each of the computers in the pool of computing systems is communicatively connected (e.g. via USB or Bluetooth) to the redundant hardware interface printed circuit board (PCB) 307. The PCB board 307 may include one or more microcontrollers that are connected to various peripheral devices that are part of the gas supply system or monitoring system. For example, the microcontrollers may be responsible for operating one or more physical components of a gas cabinet such as pumps, solenoids 308, pressure transducers 309, switches 310, valves, or other devices. These microcontrollers communicate to their respective cluster computing systems (e.g. computer 303A or computer 303B) via USB or other wired or wireless connection. The microcontroller that is connected to the high availability computing cluster 301 and is currently in control is the microcontroller that communicates to the peripheral devices. In such cases, the other microcontroller(s) act as a backup to the active microcontroller.

The health of the high availability computing cluster computers, as well as the health of the PCB microcontrollers 307, may be monitored using a continuous "heartbeat" signal. For the cluster computers, this heartbeat signal may be sent via a network router 302 such as an Ethernet router. The microcontrollers on the PCB board send their heartbeat via the USB or other wired or wireless connections. The high availability computing cluster 301 may be powered by a dual power supply unit 306. The dual power supply unit 306 provides a pair of power supplies where, at least in some cases, only one power supply is needed to operate the hardware device. In such cases, the second power supply acts as a backup if the first power supply fails.

Embodiments of the high availability computing cluster described herein may implement various types of computing systems. These computing systems may take a wide variety of forms. For instance, computing systems may be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one hardware processing unit and a memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads). As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

As mentioned above, FIG. 3 illustrates a high availability computing cluster 301. The high availability computing cluster may include many different electrical and non-electrical components. These components may be contained in a housing, or may be external to the housing. The components may include a router 302, such as an Ethernet router, which allows communication between the high availability computing cluster and external computing systems. For example, the Ethernet router may connect the high availability computing cluster to a customer's network, either directly or indirectly.

The high availability computing cluster 301 further includes two or more computing systems with the same (or similar) software applications running thereon. The software applications may be configured to operate or control a hardware devices or components of the gas supply system 101 and/or the gas panel monitoring system 201. The gas control system may be a combination of components and controls that regulate the flow of certain gases within an environment. For instance, as noted above, in a semiconductor fabrication assembly, many different toxic and non-toxic chemicals and gases are used in the fabrication process. These gases and chemicals need to be delivered efficiently, safely, and reliably. Gas control systems provide such functionality. The high availability computing cluster described herein may interoperate with a gas control system to control the various valves, switches, pumps, electronic controls and other components that control operation of the system.

The cluster of FIG. 3 includes computing systems 303A and 303B. Each computer in the cluster has its own IP address so as to be identified within the network. The cluster may also have a common IP address that is shared by the other computer systems in the cluster. The common IP address allows external users or computing systems to communicate with the cluster, regardless of which computer system is actually responding.

As shown in FIG. 3, computer 303A may be set up as the default computer in the cluster of computing systems. The default computer system is the computer system that operates the gas supply system. Computer 303B (and any other computer systems in the cluster) may be designed to enter a standby mode. In standby mode, computer system 303B listens to the operating state of the gas supply system components. If, for some reason, computer 303A fails, computer 303B (or one of the other computer systems in the cluster) will take over the control of the gas cabinet or other device automatically without downtime. Computer 303A may be also be configured to instantiate a web server or other application. If computer 303A fails, then computer 303B seamlessly takes over hosting the web server or other application via the shared IP address.

Each of the computers in the pool of computing systems is communicatively connected (e.g. via USB or Bluetooth) to the redundant hardware interface (RHI) board 307. The RHI board may include multiple microcontrollers that are connected to peripheral devices that are part of the hardware device. For example, as mentioned above, in cases where a gas panel is being controlled or monitored, the microcontrollers on the RHI board 307 may be responsible for operating physical components of the gas cabinet such as pumps, solenoids, transducers, switches, etc. These microcontrollers communicate to their respective cluster computing systems (e.g. computer 303A or computer 303B) via USB or other wired or wireless connection. One of the microcontrollers may be set up as the default, while other controllers act as a backup to the default microcontroller.

The computer systems 303A and 303B are interchangeable with each other, so that if the first computing systems fails, the second computing system will assume control of the hardware devices, and will further take over hosting the web server via the shared IP address. The high availability computing cluster also includes at least one software application running independently on both the first and second computing systems. The software application is configured to operate the gas supply system using software commands and routines. The high availability computing cluster 301 includes a redundant hardware interface 307 configured to communicate commands generated by the software application with the components of the gas supply system.

Each component on the gas control system may be individually controllable by the high availability computing cluster using the software application and the microcontrollers. It should be noted that while a gas supply and monitoring system has been used as an example herein, many different types of hardware devices may be implemented with, controlled by and maintained by the high availability computing cluster, including HVAC units, solar arrays, water distribution systems, power grids, battery arrays or other systems.

Users may interact with the software application using a touchscreen 305 or other user interface. For instance, as shown in FIG. 3, a touchscreen display 305 may be provided, using which a user may change settings or operational features of the hardware device that is being controlled using the high availability computing cluster 301. The controls for the gas cabinet or other hardware device may be displayed in a web browser 304 or other application such as a standalone application. This application may be provided by a web server hosted on the one of the computing systems of the high availability computing cluster.

The first, second and any other computing systems in the high availability computing cluster may each be hot-swappable. As such, each computing system may be removed or replaced at any time, without affecting the functionality of the high availability computing cluster (assuming that at least one computing system remains) in the cluster 301. In some cases, one of the computing systems may be established as a default computing system for the high availability computing cluster. The default computing system hosts the web server and/or other applications, and interfaces with the RHI board 307. The second, third or subsequent computing systems may be put into standby mode, listening to the operating state of the default computing system. If the computing systems on standby mode determine that the default computing system has failed, they may appoint one computing system be the new default computing system and to assume its duties.

In some cases, computer 303B may be further configured to monitor data received from the gas supply and monitoring systems. For instance, the gas panel monitoring system 201 may output video feed data as part of its normal operation. The gas supply system 101 of FIG. 1 may receive feedback data 107 from various components or devices. The data may be related to its operational parameters or current operating state (e.g. gas flow rate, internal temperature, line pressure, current or voltage levels, or other parameters). The data may be analyzed by the computer systems in the high availability computing cluster 301, and/or may be transmitted to an external computing system (e.g. a cloud system) for analysis and storage.

The redundant hardware interface 307 of the high availability computing cluster may be a printed circuit board (PCB) or other electrical component or platform that can function as a hardware interface. The computing systems of the high availability computing cluster are connected to the RHI PCB 307 via a wired or potentially wireless connection. For example, computer 303A and computer 303B in the high availability computing cluster 301 may be connected via USB to the RHI PCB. The RHI board includes at least two microcontrollers that are connected to the system that is to be controlled. The microcontrollers are either directly or indirectly connected to peripheral hardware devices that are part of the sysstem. For instance, the microcontrollers may be directly or indirectly connected to the solenoids, transducers, switches, valves and/or pumps that control the functionality of a gas control system.

In cases where multiple microcontrollers are apportioned on the RHI board 307, the microcontroller that is connected to the computing system and that is currently in control of the hardware device is the microcontroller that communicates to the peripheral hardware devices. Thus, in the gas supply system example, if a microcontroller is in control of the gas supply system, it is also the microcontroller that communicates with the switches, pumps and other peripheral hardware devices of the gas supply system 101. Other microcontrollers in the system may be placed in standby mode, and may watch for failures of the active microcontroller.

This watching or monitoring the health of the microcontrollers may also be applied to the computing systems of the high availability computing cluster 301. Indeed, a continuous heartbeat signal may be sent out through the Ethernet router 302. Each component may respond to the heartbeat signal and provide operational state information. This operational state information may indicate how well the component is working, and may indicate whether a failure has happened or is imminent. Redundancy may also be provided by dual power supplies. A dual power supply unit may include two or more separate power supplies. In cases where only one of the two power supplies 306 is needed to operate the high availability computing cluster and/or the one or more hardware devices, the other power supply can act as a backup, and can switch over seamlessly when needed.

Figure 5:
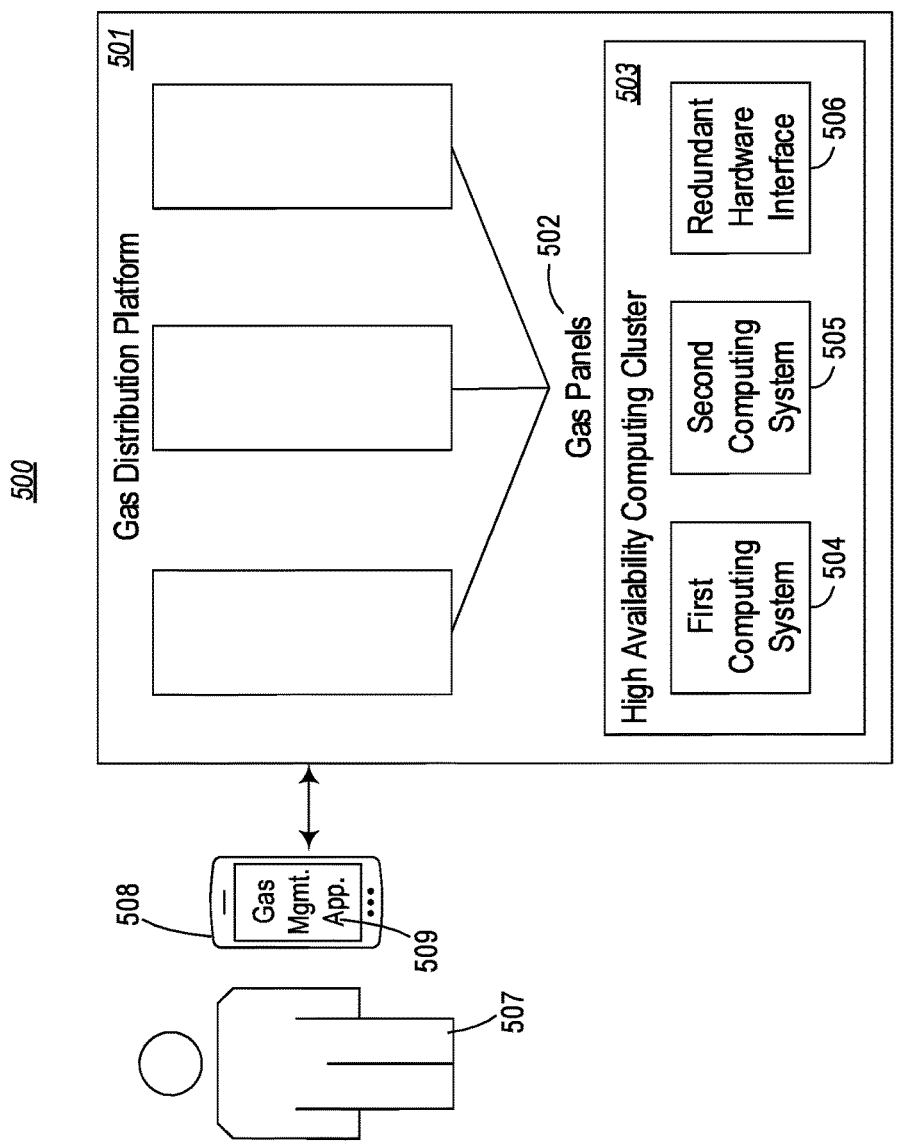
FIG. 5 illustrates an embodiment of a gas distribution platform that includes a high availability computing cluster.

Turning now to environment 500 of FIG. 5, a gas distribution platform 501 is provided. The gas distribution platform 501 may be controlled via the high availability computing cluster 301 of FIG. 3, and accessed or controlled via the gas supply system management application 401 of FIG. 4. The gas distribution platform 501 includes multiple gas panels 502. Each of these gas panels has an enclosure that includes a gas dispensing manifold (e.g. 103 of FIG. 1). Gas flow through the gas dispensing manifold is regulated using solenoids 104. The gas distribution platform 501 also includes a high availability computing cluster 503 such as 301 described above in conjunction with FIG. 3. The high availability computing cluster 503 is configured to receive information from and communicate information to the various gas panels 502.

The high availability computing cluster 503 includes a first computing system 504 that controls one or more of the gas panels 502. The first computing system has an assigned internet protocol (IP) address and is configured to host a web server via a shared IP address. The high availability computing cluster 503 also includes a second computing system 505 that acts as a backup to the first computing system. The second computing system also has an assigned IP address. The first and second computing systems 504 and 505 are interchangeable with each other. As such if the first computing systems 504 fails, the second computing system 505 will assume control of the gas panels 502, and will take over hosting the web server via the shared IP address. The high availability computing cluster 503 also has at least one software application 509 running independently on both the first and second computing systems 504 and 505. The software application 509 allows a user 507 to operate the gas panels 502. A redundant hardware interface 506 includes microcontrollers that are configured to communicate commands generated by the software application with the gas panels 502.

The first and second computing systems 504 and 505 are hot-swappable, as are any other computing systems included in the high availability computing cluster 503. Thus, if one computing system goes down, another immediately begins working in its place. The second (or subsequent) computing systems can remain operating a standby mode, listening to the operating state of the first computing system, and can automatically fail over and take control of the system if the first computing system fails. Dual power supplies ensure that the high availability computing cluster 503 has continuous power, as only one of the two power supplies is needed to operate the high availability computing cluster and/or the gas panels 502 of the platform 501.

Using the designs shown in FIGS. 1-5, a highly scalable, redundant system is provided. The high availability computing cluster 503 can manage substantially any number of gas panels, gas supply systems or gas panel monitoring systems. The high availability computing cluster 503 may be located on site, at a manufacturing facility, or may be located remotely. The high availability computing cluster 503 is easily serviced, and can run on reduced or low processing power computer systems. This renders the system highly scalable and cost effective. The systems herein also provide enhanced inventory control. The systems herein provide cradle-to-grave control of equipment inventory such as gas bottle. Once a bottle is scanned and recorded into the system, the life of that bottle of potentially hazardous and expensive material is monitored and recorded and tracked in the system. Video cameras record and date specific aspects of the process. Monitoring operations may also raise the level of awareness of the technicians and other operators. Specialized reports may be generated on the software application 509 and may be electronically delivered to managers.

Accordingly, systems, apparatuses and devices are provided which including a gas supply system, a gas panel monitoring system and a gas distribution platform. Any or all of these systems may implement a high availability computing cluster that provides redundancy, scalability, communication and control features with electronic devices including mobile phones.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A gas supply system, comprising:
a gas panel defining an enclosure that includes a gas dispensing manifold, wherein gas flow through the gas dispensing manifold is regulated using one or more solenoids;
a redundant control system that is electrically connected to the one or more solenoids, wherein the redundant control system is configured to send actuation signals to the solenoids to allow or prevent gas from flowing through the gas dispensing manifold, the redundant control system including at least one secondary, mirrored control system configured to assume control of the gas panel on demand; and
a communications module that allows the redundant control system to monitor a plurality of other gas panels, the monitoring including receiving feedback from gas cabinet components regarding component operational status and transmitting actuation signals from the redundant control system to the gas panel.

2. The gas supply system of claim 1, wherein the gas panel further comprises one or more gas storage and dispensing vessels mounted in the enclosure and joined in gas flow communication with the gas dispensing manifold.

3. The gas supply system of claim 1, wherein the gas panel and the redundant control system are located in a secure room that is only accessible to authorized persons.

4. The gas supply system of claim 3, wherein the authorized persons provide credentials indicating proof of certifications that allow them to perform tasks within the enclosure of the gas panel.

5. The gas supply system of claim 1, wherein the gas panel comprises a valve manifold box (VMB) that controls pressure and flow of gases through the gas dispensing manifold, ensuring that pressure and flow to one or more connected tools is substantially constant.

6. The gas supply system of claim 5, wherein the valve manifold box includes or is connected to an electronic pressure regulator that controls gas pressure to an inlet of a mass flow controller (MFC) which controls gas flow in the gas panel.

7. The gas supply system of claim 6, wherein the electronic pressure regulator comprises at least one of a dome loaded pressure regulator or an electro-pneumatic pressure regulator, each of which is configured to receive control signals issued by the redundant control system.

8. The gas supply system of claim 7, wherein pressure feedback readings at the MFC are provided to the dome loaded pressure regulator or to the electro-pneumatic pressure regulator to control gas line pressure.

9. The gas supply system of claim 1, wherein the communications module provides remote access to the redundant control system, allowing the redundant control system to be accessed via a portable electronic device.

10. A gas panel monitoring system, comprising:
one or more cameras positioned in view of at least one gas panel, the gas panel being located within a controlled access area;
one or more cameras positioned in view of an access door that allows entrance into to the controlled access area;
an equipment recognition system configured to determine whether pieces of equipment are being taken into the controlled access area and, if so, identify which pieces of equipment are being taken into the controlled access area; and
a controller configured to monitor video feed data from the cameras to verify that safety protocol steps related to the identified pieces of equipment are being followed before access to the gas panel in the controlled access area is granted,
wherein video feed data from the one or more cameras positioned in view of the at least one gas panel, and video feed data from the one or more cameras positioned in view of the access door is provided to a portable electronic device for monitoring.

11. The gas panel monitoring system of claim 10, further comprising an electronic identification device configured to grant or prevent access to the controlled area based on electronic identifiers provided to the electronic identification device.

12. The gas panel monitoring system of claim 10, wherein the controller allows or prevents tasks from being performed on the gas panel based on the identity of one or more persons who are accessing the gas panel.

13. The gas panel monitoring system of claim 10, further comprising a radio frequency identification (RFID) device configured to read RFID tags placed on gas panel equipment.

14. The gas panel monitoring system of claim 10, further comprising a display device configured to display video feed data from the one or more cameras positioned in view of the at least one gas panel, and video feed data from the one or more cameras positioned in view of the access door.

15. A gas distribution platform controlled via a high availability computing cluster, comprising:
a plurality of gas panels each defining an enclosure including therein a gas dispensing manifold, wherein gas flow through the gas dispensing manifold is regulated using one or more solenoids;
a high availability computing cluster configured to receive information from and communicate information to the plurality of gas panels, the high availability computing cluster including:
a first computing system that controls one or more of the gas panels, the first computing system having an assigned internet protocol (IP) address and being configured to host a web server via a shared IP address;
a second computing system that acts as a backup to the first computing system, the second computing system having an assigned IP address, wherein the first and second computing systems are interchangeable with each other, such that if the first computing systems fails, the second computing system will assume control of the one or more gas panels, and will take over hosting the web server via the shared IP address;
at least one software application running independently on both the first and second computing systems, the software application being configured to operate the one or more gas panels; and a redundant hardware interface configured to communicate commands generated by the software application with the one or more gas panels.

16. The gas distribution platform of claim 15, wherein the first and second computing systems are hot-swappable.

17. The gas distribution platform of claim 15, wherein the second computing system is in a standby mode, listening to the operating state of the first computing system.

18. The gas distribution platform of claim 15, further comprising a dual power supply unit that includes two separate power supplies, wherein only one of the two power supplies is needed to operate the high availability computing cluster and/or the plurality of gas panels.

* * * * *